No. 771,626. PATENTED OCT. 4, 1904.
G. H. GILMAN.
DRILL CHUCK.
APPLICATION FILED DEC. 16, 1903.
NO MODEL.
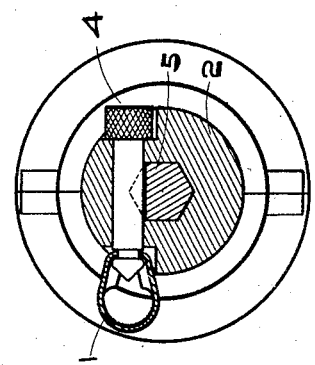
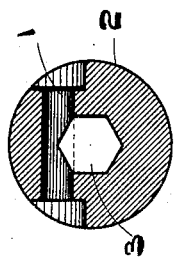
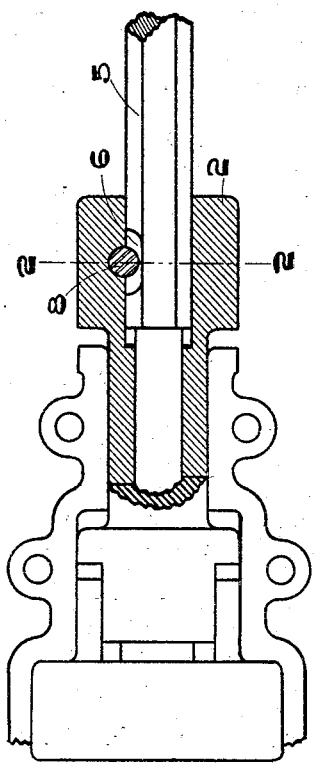
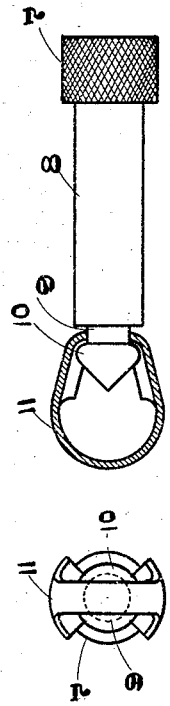
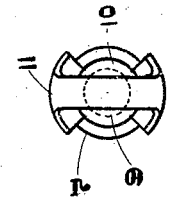
Witnesses
Inventor
GEORGE H. GILMAN,
By Edward R. Inman
Attorney No. 771,626.

Patented October 4, 1904.

UNITED STATES PATENT OFFICE.

GEORGE H. GILMAN, OF FRANKLIN, PENNSYLVANIA.

DRILL-CHUCK.

SPECIFICATION forming part of Letters Patent No. 771,626, dated October 4, 1904.

Application filed December 16, 1903. Serial No. 185,451. (No model.)

*To all whom it may concern:*

Be it known that I, GEORGE H. GILMAN, a citizen of Canada, residing at Franklin, in the county of Venango and State of Pennsylvania, have invented certain new and useful Improvements in Drill-Chucks, of which the following is a specification, reference being had therein to the accompanying drawings.

My invention relates to an improved chuck for rock-drills, and will be fully understood from the following specification, reference being had to the accompanying drawings, forming a part thereof, and which are sufficiently full, clear, and exact to enable those skilled in the art to which it appertains to make and use the same.

In said drawings, Figure 1 is an elevation, partly in section, of a chuck which embodies my invention. Fig. 2 is a section on line 2 2 of Fig. 1. Fig. 3 is an elevation of my locking-pin, the spring-clamp which holds the same in place being here shown in section. Fig. 4 is an end view of Fig. 3. Fig. 5 is a section of my chuck at the line 2 2 with the bit and locking-pin removed.

The same reference-numerals indicate identical parts in the several views.

The main object of my device is to provide a cheap, durable, efficient, and convenient locking device for the bit of a rock-drill and one which will allow a certain amount of longitudinal movement of the bit within the chuck.

The construction of my device is substantially as follows: The chuck 2 has a hole 1 drilled transversely through the same, which hole 1 intersects a hexagonal socket 3 at one side thereof, so that when the locking-pin 4 is inserted in the hole 1 (see Fig. 2) it occupies a portion of said socket 3. The drill-bit 5 is cut away or relieved at one side in such a manner that said relief 6 registers with the hole 1 in the chuck when the drill is in place and permits the pin 4 to be readily inserted. Said relief 6 is somewhat elongated for the purpose of allowing some longitudinal movement of the bit within the chuck. The locking-pin, Fig. 3, has upon one end thereof an enlarged head 7, a body 8 of sufficient length to reach through the chuck, a contracted neck 9, and a conical head 10. After the pin has been inserted in position a specially-formed spring-clamp 11 is placed upon the neck 9, which secures the pin in position, thus locking the bit securely in place.

Having thus described my invention, what I claim as new, and desire to secure by Letters Patent, is—

1. A chuck for drills having a bit-socket extending longitudinally through the same, there being a pin-hole through the lower end of said chuck intersecting said socket transversely, a pin adapted to occupy said hole, there being a contracted neck at one end of said pin, a clamp adapted to clamp said neck for the purpose set forth, in combination with a drill-bit having an elongated relief at one side thereof adapted to register with said pin-hole.

2. A chuck for drills having a bit-socket extending longitudinally through the same and a pin-hole extending transversely through the chuck and intersecting said socket, a pin adapted to occupy said pin-hole, a clamp adapted to engage one end of said pin, for the purpose specified, in combination with a bit having an elongated relief at one side thereof, adapted to the admission of said pin, and whereby said bit is adapted to a longitudinal movement within the socket.

In testimony whereof I affix my signature in presence of two witnesses.

GEORGE H. GILMAN.

Witnesses:
 W. M. ARNOLD,
 D. HASTINGS.